Jan. 18, 1966  W. BALTZ  3,229,665
SELF-FEEDING SILO
Filed Aug. 17, 1964  2 Sheets-Sheet 1
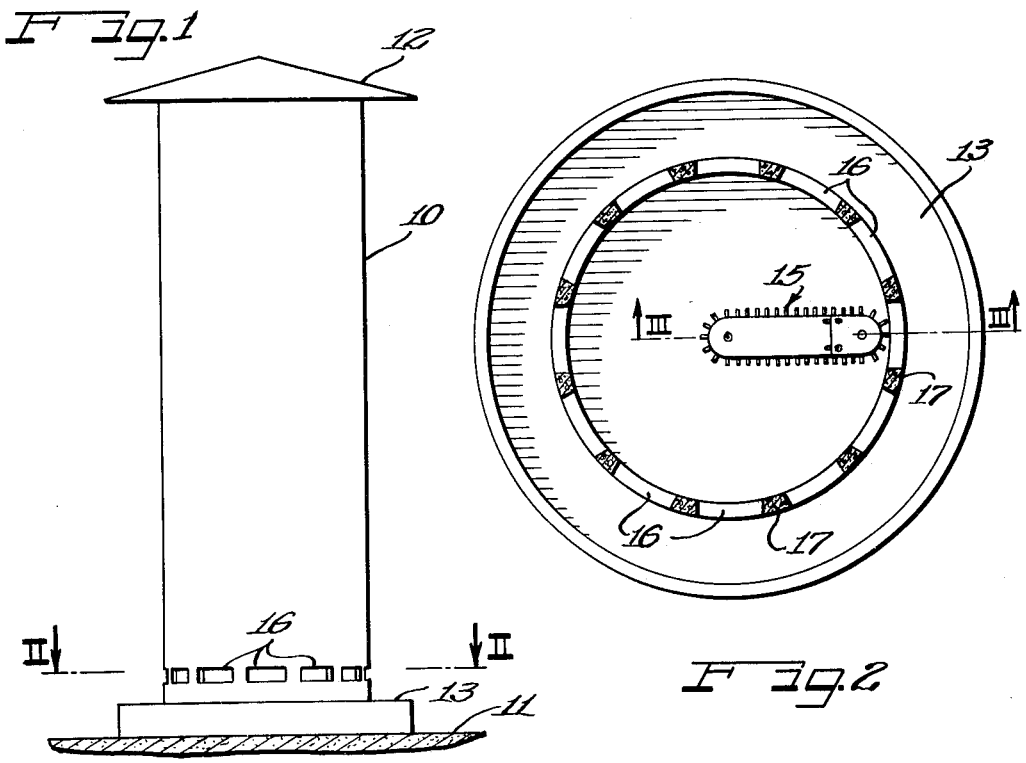
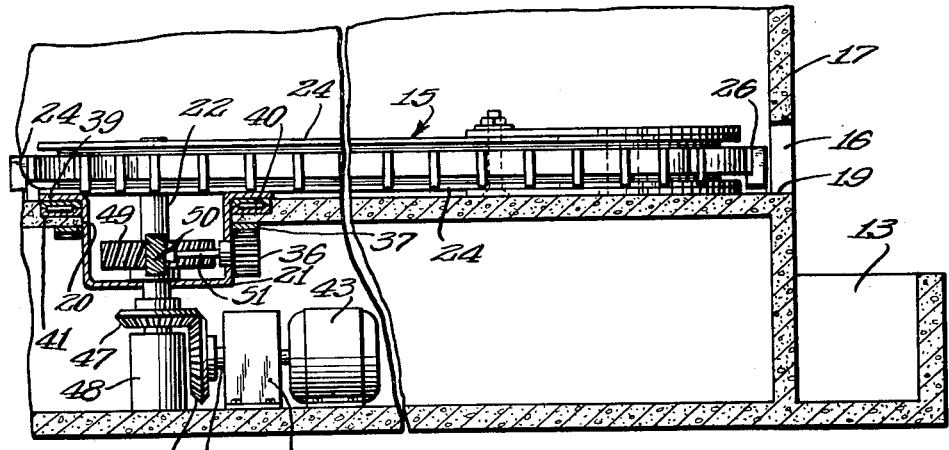
INVENTOR.
William Baltz
BY Hill, Sherman, Meroni, Gross & Simpson  ATTORNEYS

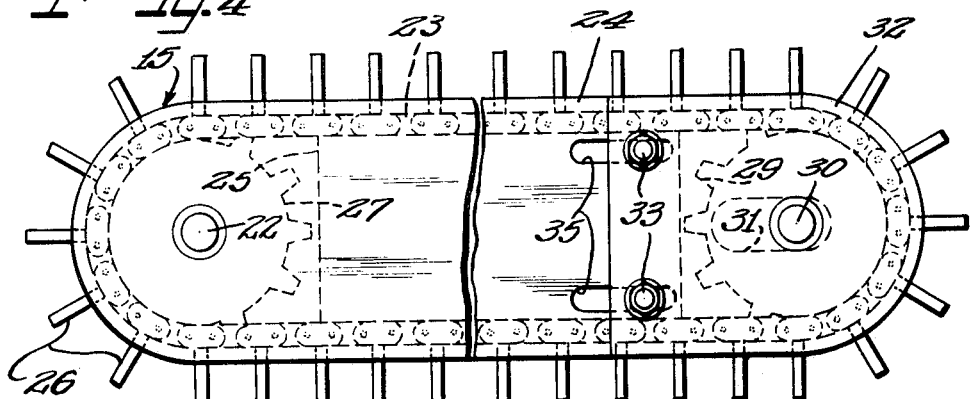
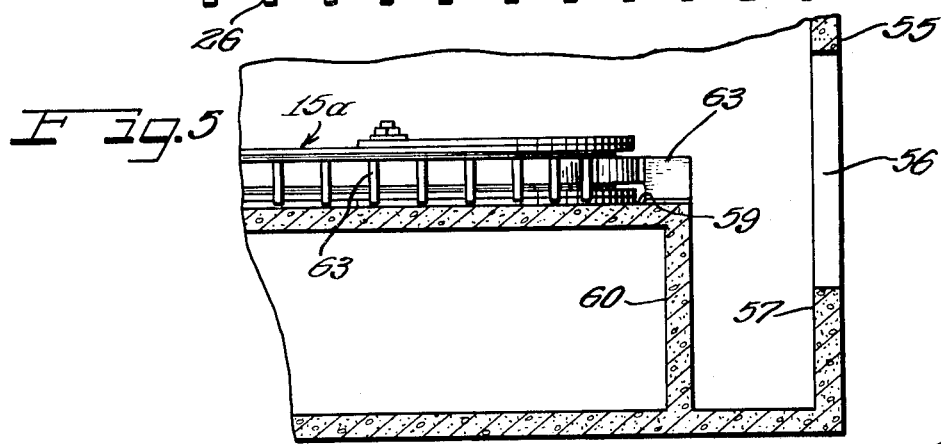
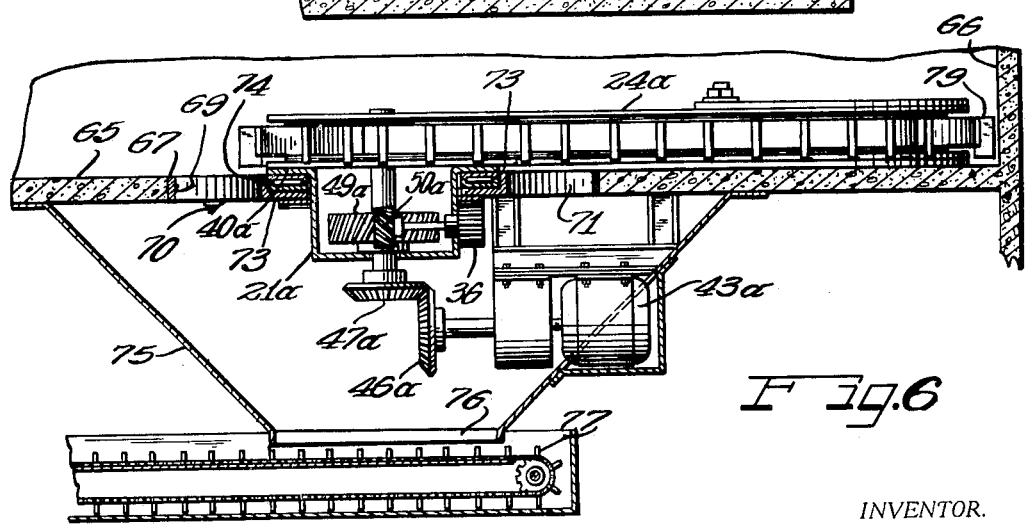

United States Patent Office 3,229,665
Patented Jan. 18, 1966

3,229,665
SELF-FEEDING SILO
William Baltz, Rte. 4, Pocahontas, Ark.
Filed Aug. 17, 1964, Ser. No. 390,107
3 Claims. (Cl. 119—52)

This invention relates to improvements in feeding devices for live stock and more particularly relates to an improved form of self-feeding silo.

A principal object of the present invention is to provide an improved form of self-feeding silo arranged with a view toward utmost simplicity in construction and efficiency in operation.

Another object of the invention is to provide a novel form of silo having a simple form of conveyor traveling about the silo about the axis thereof and driven from its axis of turning movement to continually supply silage to a manger on the outside of the silo with little or no attention from the operator of the device.

A further object of the invention is to provide an improved self-feeding silo having a manger extending thereabout together with an orbitally guided conveyor having horizontally projecting flights for continually feeding silage to the manger with a simplified form of drive to the conveyor at the center of the silo for driving the conveyor and feeding the conveyor about the silo.

Still another object of the invention is to provide a self-feeding silo arranged to discharge the silage through the center of the silo onto a conveyor in silage receiving relation with respect thereto and to utilize a horizontally traveling orbitally guided conveyor driven from the center of the silo and progressed about the silo by drive mechanism at the center thereof.

These and other objects of the invention will appear from time to time as the following specification proceeds and with reference to the accompanying drawings wherein:

FIGURE 1 is a view in side elevation of a silo constructed in accordance with the principles of the present invention;

FIGURE 2 is a horizontal sectional view taken substantially along line II—II of FIGURE 1;

FIGURE 3 is a fragmentary vertical sectional view taken substantially along line III—III of FIGURE 2;

FIGURE 4 is a fragmentary plan view of the orbitally guided conveyor;

FIGURE 5 is a vertical sectional view illustrating a modified form in which the silo of the invention may be constructed; and FIGURE 6 is a fragmentary vertical sectional view illustrating the principles of the invention applied to a center discharge silo.

In the embodiment of the invention illustrated in the drawings, I have shown in FIGURE 1 a generally cylindrical silo 10 supported on a foundation 11 and adapted to contain silage, grass or other feed materials. The silage is introduced into the silo through a suitable inlet opening in a roof 12 and is removed from the bottom portion of the silo and supplied to a manger 13 through an unloading unit in the form of a horizontally traveling conveyor 15 advancing the silage through openings 16 in a cylindrical wall 17 of the silo.

The silo 10 may be of a reinforced concrete construction and has a floor 19 spaced above the foundation and having a central opening 20 therein in which is rotatably mounted a housing 21, housing drive mechanism for advancing the feeder 15 along the floor 19 about the axis of a drive shaft 22 for the feeder and coaxial of the center of the silo 10.

The feeder 15 is shown as being a horizontally traveling conveyor including a chain 23 guided for movement about spaced top and bottom plates 24 spaced apart by a spacer plate 25. The chain 23 may be of a conventional form of link type of chain having attachments in the form of flights 26 extending laterally therefrom and downwardly of the perimeter of the lower plate 24 into close proximity to the floor. The chain 23 meshes with and is driven from a drive sprocket 27 on the upper end of the shaft 22. The sprocket 27 is disposed between the plates 24 and said plates form bearing supports for the upper end portion of the shaft 22 in a conventional manner. The chain 23 changes its direction of travel at the opposite ends of the plates 24 about an idler sprocket 29 rotatably mounted on an idler shaft 30 extending through elongated slots 31 in the plates 24 and mounted at its opposite ends in take-up plates 32 generally conforming to the form of the plates 24 and extending along the tops and bottoms of said plates to form a tension take-up for the chain 23. The take-up plates 32 are secured to the plates 24 as by nuts and bolts 33 extending through the take-up plates 32 and through elongated slots 35 formed in the plates 24 and in the spacer plate 25 to enable the tension of the chain 23 to be taken up in a conventional manner.

The bottom plate 32 may serve as a shoe supporting the forward end portion of the feeder for movement along the floor 19 by operation of a pinion 36 engageable with a downwardly facing annular rack 37 suitably secured to the bottom surface of the floor 19 and depending therefrom and extending about the opening 20 for the housing 21.

The housing 21, as shown in FIGURE 3, has an annular flange 39 extending outwardly therefrom and abutting the bottom of the bottom plate 24 and welded or otherwise secured thereto. The bottom surface of the annular flange 39 rests on an annular race 40 of a roller bearing 41 recessed in the floor 19 and forming a bearing support for the housing 21 and the rear portion of the feeder 15.

The shaft 22 is shown in FIGURE 3 as driven from a motor 43 driving a speed reducer (not shown) contained in a housing 44. A drive shaft 45 extends from the housing 44 and has a bevel gear 46 keyed or otherwise secured thereto. The bevel gear 46 meshes with a bevel gear 47 keyed or otherwise secured to the shaft 22 intermediate its ends. The lower end of the shaft 22 may extend within a bearing support 48 extending upwardly of the foundation and forming a bearing support means for said shaft.

The means for advancing the silo unloading means or feeder 15 along the floor 19 about the axis of the shaft 22 may be of various forms and is diagrammatically shown as comprising a helical gear 49 keyed or otherwise secured to the shaft 22 and driving a helical gear 50 on a horizontal shaft 51. The shaft 51 is suitably journalled in the wall of the housing 22, intermediate its ends, and has the pinion 36 keyed or otherwise secured to an outer end thereof, for rotatably driving said pinion and advancing the feeder along the floor 19.

The feeder 15 may be driven to advance about the silo as the conveyor chain 23 is driven to advance the loose material through the openings 16. The feeder 15 thus forms a means for maintaining a continuous supply of silage in the manger 13. The motor 43 may be started and stopped under automatic control (not shown) or may be manually controlled either from the silo from a position remote from the silo, to avoid over-filling of the manger 13. With this form of the invention, since the manger 13 is unobstructed, the number of cattle feeding may be relatively unlimited and is considerably greater than where the manger is covered.

In FIGURE 5, I have shown a modified form of self-feeding silo in which an outer wall 55 of the silo has a series of relatively deep and wide openings 56 therein through which the cattle may feed from a manger 57. In this form of the invention, I have shown an elevated floor 59 terminating in an annular vertically extending wall 60 spaced radially inwardly of the wall 55 and defining the inner wall of the manger 57. A feeder 15a like the feeder 15 is progressed along the elevated floor 59 and flights 63 thereof progress the silage along the floor 59 from the center of the silo and wipe the silage from said floor to drop into the manger 57. The flights 63 are similar to the flights 27 except they are longer to extend at least to the outer edge of the floor 61 to maintain the floor clean during the feeding operation.

This form of the invention, while limiting the number of cattle that may be fed at one time, affords better protection for the silage in rough weather and is more suitable for climates in which the rain or snow may be heavy and frequent.

In FIGURE 6, I have shown an adaptation of the invention to a center discharge self-feeding silo. In this form of the invention an elevated floor 65 extends entirely to a wall 66 of the silo, which is closed throughout its circumference. The floor 65 has a relatively wide opening 67 therein within which is mounted a ring or rim 69 of a spider 70. The ring 69 has a plurality of inwardly extending spokes or bars 71 supporting at their inner margins a collar 73 having an annular roller bearing 74 recessed therein the upper race of which forms a support for a flange 40a of a casing 21a. A hopper of an inverted frusto conical form extends about the discharge opening 67 and is spaced radially outwardly therefrom at its upper margin and converges to a discharge opening 76 guiding the silage to a conveyor 77, which may be a conventional form of chain and flight conveyor. The conveyor 77 may be mounted on the floor or foundation for the silo and extend therealong out a suitable opening (not shown) formed in the wall of the silo for discharging the silage through the wall of the silo into a trough or manger (not shown) on the outside of the silo, or to a suitable material carrying means which may carry the silage for distribution.

A motor 43a drives flights 79 of the feeder about spaced plates 24a through meshing bevel gears 46a and 47a in the same manner as in the form of the invention illustrated in FIGURES 1 through 3. The feeder is also advanced along the floor 65 by meshing helical gears 49a and 50a, driving a pinion 36a meshing with an annular rod 37a, as in the form of the invention illustrated in FIGURES 1 through 3, so a detailed description of the drives from the motor 43a, both for driving the flights 79 about the plates 24a, 24a and for advancing the feeder along the floor 65, need not be repeated herein.

While I have herein shown and described several forms in which the invention may be embodied, it should be understood that various variations and modifications in the invention may be attained without departing from the spirit and scope of the novel concepts thereof.

I claim as my invention:

1. In a self-feeding silo of a type having a cylindrical wall extending vertically of a ground level foundation and having a top through which the silo is charged with silage,
   a wall spaced outwardly of said cylindrical wall and extending thereabout upwardly from the foundation and with the outside of said wall forming a manger,
   a floor spaced above said foundation, openings through the wall of said silo to said manger at floor level,
   a feeder movable along said floor about the center thereof for progressing material through said openings,
   said feeder comprising,
      a pair of parallel spaced guide plates having a conveyor having flights projecting laterally therefrom guided for movement thereabout,
      support means for the bottom of said plates supporting said feeder for movement about the center of said floor,
      a motor disposed beneath said floor,
      a mechanism driven from said motor for driving said chain about said plates and progressing said feeder along said floor.

2. A self-feeding silo comprising:
   a generally cylindrical wall extending upwardly of a foundation,
   a top for said wall through which the silo is loaded,
   a floor spaced above said foundation,
   a wall spaced outwardly of said generally cylindrical wall and extending thereabout,
   the space between said walls forming a manger,
   a plurality of spaced openings leading through said generally cylindrical wall with their lower margins at floor level,
   and means for effecting a continuous supply of silage through said openings comprising,
      a feeder movable along said floor about an axis coaxial with the center thereof and including a plurality of parallel spaced plates extending parallel to said floor and having a chain having flights extending outwardly therefrom guided for orbital movement about said plates,
      a drive sprocket journalled between said plates and meshing with said chain,
      a shaft for said sprocket extending through said floor,
      a motor disposed beneath said floor,
      a geared drive connection between said motor and shaft,
      an annular rack mounted on the bottom of said floor, and
      a geared drive connection from said shaft to said rack for moving said feeder along said floor about the axis of said shaft as said chain and flights are driven about said plates.

3. A self-feeding silo comprising:
   a generally cylindrical wall extending upwardly of a foundation and having a top through which the silo is loaded,
   a floor spaced above ground level,
   a wall spaced outwardly of said cylindrical wall and extending thereabout,
   the space between said wall and cylindrical wall forming a manger,
   a plurality of openings in said cylindrical wall the lower margins of which are on a level with said floor,
   a feeder moving about a central open portion of said floor for progressing the silage through said openings into the manger,
   said feeder comprising,
      a plurality of parallel spaced plates having a chain having flights extending laterally therefrom guided for movement in the space between said plates,
      a sprocket journalled in the space between said plates and meshing with said chain for driving said chain about said plates,
      means mounting said feeder for movement along the floor about an axis coaxial with the center of said floor comprising,
         an annular bearing extending about the open portion of said floor,
         a housing secured to the bottom of the lowermost of said plates through said annular bearing and supported thereon,
         a motor disposed beneath said floor,
         a shaft for driving said sprocket extending through and beneath said housing,
         a geared drive connection between said motor and said shaft,
         an annular rack extending about said opening,
         a pinion meshing with said rack, a shaft journalled in said housing for driving said pinion, and a geared drive connection from said sprocket drive shaft to said shaft, for driving said pinion upon the driving of said chain about said plates to effect the sweeping of the silage through said openings into the manger.

References Cited by the Examiner

UNITED STATES PATENTS

| | | | |
|---|---|---|---|
| 2,704,995 | 3/1955 | Dueringer | 119—52 |
| 3,093,110 | 6/1963 | Evans | 119—52 |

SAMUEL KOREN, *Primary Examiner.*

HUGH R. CHAMBLEE, *Examiner.*